United States Patent Office 3,829,471
Patented Aug. 13, 1974

3,829,471
REACTIONS OF ALKYL SULTONES WITH HALIDE SALTS IN AQUEOUS SYSTEMS
Paul Kobetz and Kenneth L. Lindsay, Baton Rouge, La., assignors to Ethyl Corporation, Richmond, Va.
No Drawing. Filed Dec. 7, 1972, Ser. No. 312,949
Int. Cl. C07c 143/02
U.S. Cl. 260—513 R                    10 Claims

ABSTRACT OF THE DISCLOSURE

It is disclosed that sultones and sulfonic acids and acid-mix obtained by sulfonating olefin or olefin mixtures with $SO_3$ are converted into salts of sulfonic acids by a reaction in an aqueous system with a salt of a volatile acid.

FIELD OF THE INVENTION

This invention relates to the preparation of sulfonic acid salts from sultones or sulfonic acids or from olefins via an intermediate sulfonation reaction.

BACKGROUND

For the most part, the prior art involved in the conversion of sultones or sulfonic acids or mixtures thereof or of the acid-mix product of olefin sulfonation into sulfonic acid salts uses two or more steps emphasizing high temperatures and strongly basic conditions because of the difficulty of performing a caustic hydrolysis of sultones and the virtual impossibility of retaining a hydrolyzed "salt" state in acid environment. Some of the prior art involves more or less critically timed complex step sequences with strong reagents. Examples of known operations are given in U.S. Pats. 2,061,617; 2,187,244; 3,642,881; and 3,496,225.

Much of the emphasis in connection with the uncomplexed $SO_3$ sulfonation of olefins to produce olefin sulfonate salts is centered about the treatment of $SO_3$ sulfonation effluent acid-mix containing about 25–60 percent sultones. When such an "acid-mix" is subjected to basic hydrolysis with aqueous NaOH there is produced the mixtures described in U.S. Pat. 3,332,880 as containing about 30–70 percent alkene sulfonic acid salts, about 20–70 percent hydroxy alkyl sulfonic acid salts and about 2–15 percent disulfonate salts.

SUMMARY OF THE INVENTION

In accordance with the present invention, a process is provided for producing sulfonic acid salt by reacting a sultone or a sulfonic acid or a mixture thereof or an acid-mix obtained by sulfonating an olefin or olefin mixture with $SO_3$.

Surprisingly, this desired result is obtained by performing the aforesaid conversion reaction in an aqueous system where the sultones or sulfonic acids or mixture thereof or the acid-mix react with a salt reactant having an anion component which forms a volatile compound when combined with hydrogen and a cation component which corresponds to the cation component of the sulfonic acid salt being formed, while removing said volatile compound to enhance conversion of the sultone or sulfonic acid or mixture thereof or acid-mix to sulfonic acid salt. The salt reactant used is preferably a halide salt, particularly a chloride, bromide or fluoride. Preferred salts are inorganic salts, especially halide salts, having ammonium, alkali metal or alkaline earth metal cations.

In a preferred aspect the salt reactant is ammonium chloride, ammonium bromide, ammonium fluoride, ammonium bifluoride, alkali metal chloride, alkali metal bromide, alkali metal fluoride, alkali metal bifluoride, alkaline earth metal chloride, alkaline earth metal bromide, or alkaline earth metal fluoride.

Particularly preferred salt reactants are ammonium chloride and sodium chloride because these salts have excellent reaction properties, are readily available at low cost and produce highly desired sulfonic acid salts.

In a preferred aspect the salt reactant is sodium chloride, potassium chloride, magnesium chloride, or calcium chloride and the salt is preferably employed in approximately a stoichiometric amount relative to the sultone or alkene sulfonic acid or mixture thereof or acid-mix used in the reaction. In this way the contamination of the product sulfonic acid with excess salt reactant is minimized.

In preferred aspects, a mixture of sultone and sulfonic acid (or mixture thereof) or an acid-mix is reacted in accordance with the present process to produce sulfonic acid salt.

Other suitable salt reactants include sodium bromide, sodium fluoride, sodium bifluoride, potassium chloride, potassium bromide, potassium fluoride, potassium bifluoride, lithium chloride, calcium chloride, calcium bromide, calcium fluoride, magnesium chloride, magnesium bromide, magnesium fluoride, barium chloride, sodium sulfide and potassium sulfide.

Where desired, the salt reactant used in the present process is suitably a salt whose cation is a metal of Groups IB, IIB, III–VI, VIIB and VIII of the Periodic Table (Fisher 1955). Thus sulfonic acid salts containing other cations such as Ti, V, Cr, Mn, Fe, Co, Ni, Cu, Zn, Al and the like may be produced via either a subsequent cation exchange type of reaction with an appropriate base containing the cation or in an initial direct reaction of an appropriate salt containing the cation. Where the direct conversion reaction is used to supply these cations, preferred salt reactants are halides such as $FeCl_3$, $AlCl_3$, $AlBr_3$, $BCl_3$, $CuCl_2$ and $ZnCl_2$. Where an exchange reaction is used based on typical ammonium sulfonic acid salt, bases containing the cations are fed to the exchange reaction as such or are generated in situ as by feeding the oxides, carbonates, etc.

The proportions of the salt reactant used relative to the sultone or sulfonic acid or mixture or acid-mix is preferably about stoichiometric, i.e., one mol of salt whose cation has a valence of 1 per mole equivalent of $SO_3$ groups. Where the reactant salt cation has a higher valence; i.e., 2, 3, 4, etc. then proportionately less mols of salt reactant are required. Since the reaction of the present process is for the most part a solid-liquid reaction, usually it is desirable to have present at least a slight excess of the salt reactant. Even a slight excess is disadvantageous in some instances because of the problem of removal of the excess salt from the sulfonic acid salt product. Thus one normally prefers to use at most a small excess of salt, typically up to about 10 percent excess. In some instances where minimum amounts of residual salt is required, it is desired to use a stoichiometric deficiency of salt reactant and then complete the conversion in a subsequent reaction using a small amount of a base such as NaOH following a reaction with NaCl.

On the other hand, some detergent or soap formulations or other utilization systems for sulfonic acid salts contain salt as a deliberately desired component. Where the product sulfonic acid salt is to be used in such an application, it may not be desirable to go to great lengths to avoid the co-presence of residual salt reactant only to have salt added subsequently. In such instances, one may prefer to use in the present conversion reaction as a salt reactant, a salt which is desired in the ultimate formulation, adjusting the amount of the excess fed for the conversion reaction to correspond to all or part of the amount of salt desired in the ultimate formulation.

One may obtain more or less pure sultones or sulfonic acids in numerous ways. For example, several processes for producing sultones are set forth in U.S. Pats. 3,117,-133; 3,146,242; 3,164,608; 3,164,609; 3,205,237; 3,524,-864; 3,579,537 and in Canadian Pat. 894,830. In addition, numerous processes are described in U.S. Pat. 3,332,-880 and the references cited therein; which, like other reference material cited herein, are herewith incorporated herein by reference. A preferred source of starting materials for the present conversion reaction is an acid mix obtained from the sulfonation of an olefin or an olefin mixture as described in various U.S. Pats. such as 2,094,-451; 2,187,244; 3,332,880 and 3,376,336, said acid mix preferably being taken prior to hydrolysis. Sulfonic acids of various forms present in starting materials are readily converted to their salts by the present salt system reaction concurrently with the conversion of sultones or in the absence of sultones to produce sulfonic acid salt as the principal salt product. In this way alkene sulfonic acids are converted to alkene sulfonic acid salts, hydroxy alkane sulfonic acids are converted to hydroxy alkane sulfonic acid salts, alkyl aryl sulfonic acids are converted to alkyl aryl sulfonic acid salts, alkane sulfonic acids are converted to alkane sulfonic acid salts, etc.

Preferred sultones or sulfonic acids or acid mixes useful in the process of the present invention have open or closed or partially closed, preferably open, carbon chain units of from about 6 to about 36 carbon atoms, preferably carbon chain units of from about 10 to about 20 carbon atoms, especially carbon chain units of from about 12 to about 18 carbon atoms. The process is workable with systems which are pure in the sense that all molecules present have the same number of carbon atoms per chain as well as in mixtures containing different carbon chain units. Particularly useful mixtures contain molecules whose uninterrupted carbon chain units contain predominantly the following numbers of carbon atoms: 12 and 14; 12, 14 and 16; 14 and 16; 14, 16 and 18; 16 and 18; 16, 18 and 20; 11, 12, 13, 14 and 15; 12, 13 and 14; 11, 13 and 15; 15, 16, 17 and 18; 15, 17 and 19 and 17, 19 and 21, and the like. These different compositions result in the production of sulfonate salts having desired properties in various water hardnesses, at different temperatures and for cleaning various materials.

The carbon skeleton structures of preferred sultones or sulfonic acids or mixtures or of the components of acid-mixes are saturated or unsaturated, and are straight chain or branched chain, cyclic or aromatic or combinations pure and in mixtures including alkyl aryl sulfonic acids, alkane mono sulfonic acids, alkene mono sulfonic acids, hydroxy alkyl mono sulfonic acids, as well as various di-sulfonic acids, hydroxy disulfonic acids and the like. Thus mixtures of sultones or sulfonic acids converted to sulfonic acid salts can contain entirely straight or branched or cyclic carbon chain units or other structures or combinations in various proportions. In general, preferred mixtures of alkane or alkene sulfonic acids contain from about 50 to about 100 percent of molecules having straight chain carbon skeleton.

The position of $SO_3$ linkage to the carbon skeleton chains in starting sulfonic acids can be at a terminal carbon atom of the chains or at an internal carbon atom. The positions of $SO_3$ linkage to the carbon chain in starting sultones or polysulfonated molecules can be at various combinations of terminal and internal carbon atoms or at internal carbon atoms. Usual mixtures contain various isomers.

A typical acid mix of sultone and sulfonic acid is obtained by sulfonating a mixture of olefins with uncomplexed $SO_3$ in a mol ratio of $SO_3$ to olefin of from about 0.5:1 to about 2:1, said olefins containing 0 to 100 percent vinyl, 0 to 100 percent vinylidene and 0 to 100 percent internal olefins and having from about 6 to about 24 carbon atoms per molecule. Such an acid-mix may be taken from the sulfonation operation and reacted in the present process preferably without intervening treatment with acids or bases. Of course, where desired, various components of such an acid-mix may be selected or rejected using various processes such as solvent extraction and the like.

A mixture of sultone or sulfonic acids or an acid mix containing a mixture in regard to one or more of (1) numbers of carbon atoms per molecule, (2) carbon skeleton structures and (3) position of $SO_3$ linkages to the carbon skeleton structure is generally preferred because such can be readily produced in one operation by sulfonating a mixture of olefins as available in large quantities and at low cost. Preferably such olefin mixtures are selected to produce product sulfonic acid salt having desired properties either per se or when used in combination with various other sulfonate materials generally used in detergent and other surface active formulations.

Typical sultones processed in accordance with the present invention include:

3-hydroxydecane-1-sulfonic acid sultone,
4-hydroxydecane-1-sulfonic acid sultone,
3-hydroxyundecane-1-sulfonic acid sultone,
4-hydroxyundecane-1-sulfonic acid sultone,
3-hydroxydodecane-1-sulfonic acid sultone,
4-hydroxydodecane-1-sulfonic acid sultone,
3-hydroxytridecane-1-sulfonic acid sultone,
4-hydroxytridecane-1-sulfonic acid sultone,
3-hydroxytetradecane-1-sulfonic acid sultone,
4-hydroxytetradecane-1-sulfonic acid sultone,
3-hydroxypentadecane-1-sulfonic acid sultone,
4-hydroxypentadecane-1-sulfonic acid sultone,
3-hydroxyhexadecane-1-sulfonic acid sultone,
4-hydroxyhexadecane-1-sulfonic acid sultone,
3-hydroxyheptadecane-1-sulfonic acid sultone,
4-hydroxyheptadecane-1-sulfonic acid sultone,
3-hydroxyoctadecane-1-sulfonic acid sultone,
4-hydroxyoctadecane-1-sulfonic acid sultone,
3-hydroxynonadecane-1-sulfonic acid sultone,
4-hydroxynonadecane-1-sulfonic acid sultone,
3-hydroxyeicosane-1-sulfonic acid sultone,
4-hydroxyeicosane-1-sulfonic acid sultone,
3-hydroxyheneicosane-1-sulfonic acid sultone,
4-hydroxyheneicosane-1-sulfonic acid sultone,
3-hydroxydocosane-1-sulfonic acid sultone,
4-hydroxydocosane-1-sulfonic acid sultone,
3-hydroxytricosane-1-sulfonic acid sultone,
4-hydroxytricosane-1-sulfonic acid sultone,
3-hydroxytetracosane-1-sulfonic acid sultone,
4-hydroxytetracosane-1-sulfonic acid sultone.

Typical alkene sulfonic acids processed in accordance with the present invention include:

1-decene-1-sulfonic acid,
2-decene-1-sulfonic acid,
3-decene-1-sulfonic acid,
4-decene-1-sulfonic acid,
1-undecene-1-sulfonic acid,
2-undecene-1-sulfonic acid,
3-undecene-1-sulfonic acid,
4-undecene-1-sulfonic acid,
1-dodecene-1-sulfonic acid,
2-dodecene-1-sulfonic acid,
3-dodecene-1-sulfonic acid,
4-dodecene-1-sulfonic acid,
1-tridecene-1-sulfonic acid,
2-tridecene-1-sulfonic acid,
3-tridecene-1-sulfonic acid,
4-tridecene-1-sulfonic acid,
1-tetradecene-1-sulfonic acid,
2-tetradecene-1-sulfonic acid,
3-tetradecene-1-sulfonic acid,
4-tetradecene-1-sulfonic acid,
1-pentadecene-1-sulfonic acid,
2-pentadecene-1-sulfonic acid,
3-pentadecene-1-sulfonic acid,
4-pentadecene-1-sulfonic acid, 1-hexadecene-1-sulfonic acid,
2-hexadecene-1-sulfonic acid,
3-hexadecene-1-sulfonic acid,
4-hexadecene-1-sulfonic acid,
1-heptadecene-1-sulfonic acid,
2-heptadecene-1-sulfonic acid,
3-heptadecene-1-sulfonic acid,
4-heptadecene-1-sulfonic acid,
1-octadecene-1-sulfonic acid,
2-octadecene-1-sulfonic acid,
3-octadecene-1-sulfonic acid,
4-octadecene-1-sulfonic acid,
1-nonadecene-1-sulfonic acid,
2-nonadecene-1-sulfonic acid,
3-nonadecene-1-sulfonic acid,
4-nonadecene-1-sulfonic acid,
1-eicosene-1-sulfonic acid,
2-eicosene-1-sulfonic acid,
3-hydroxy-nonadecane-1-sulfonic acid,
3-eicosene-1-sulfonic acid,
4-eicosene-1-sulfonic acid,
1-heneicosene-1-sulfonic acid,
2-heneicosene-1-sulfonic acid,
3-heneicosene-1-sulfonic acid,
4-heneicosene-1-sulfonic acid,
1-docosene-1-sulfonic acid,
2-docosene-1-sulfonic acid,
3-docosene-1-sulfonic acid,
4-docosene-1-sulfonic acid,
1-tricosene-1-sulfonic acid,
2-tricosene-1-sulfonic acid,
3-tricosene-1-sulfonic acid,
4-tricosene-1-sulfonic acid,
1-tetracosene-1-sulfonic acid,
2-tetracosene-1-sulfonic acid,
3-tetracosene-1-sulfonic acid, and
4-tetracosene-1-sulfonic acid.

Typical hydroxy alkane sulfonic acids convertible to salts in accordance with the present invention include:

3-hydroxy-decane-1-sulfonic acid,
4-hydroxy-decane-1-sulfonic acid,
5-hydroxy-decane-1-sulfonic acid,
3-hydroxy-undecane-1-sulfonic acid,
4-hydroxy-undecane-1-sulfonic acid,
5-hydroxy-undecane-1-sulfonic acid,
3-hydroxy-dodecane-1-sulfonic acid,
4-hydroxy-dodecane-1-sulfonic acid,
5-hydroxy-dodecane-1-sulfonic acid,
3-hydroxy-tridecane-1-sulfonic acid,
4-hydroxy-tridecane-1-sulfonic acid,
5-hydroxy-tridecane-1-sulfonic acid,
3-hydroxy-tetradecane-1-sulfonic acid,
4-hydroxy-tetradecane-1-sulfonic acid,
5-hydroxy-tetradecane-1-sulfonic acid,
3-hydroxy-pentadecane-1-sulfonic acid,
4-hydroxy-pentadecane-1-sulfonic acid,
5-hydroxy-pentadecane-1-sulfonic acid,
3-hydroxy-hexadecane-1-sulfonic acid,
4-hydroxy-hexadecane-1-sulfonic acid,
5-hydroxy-hexadecane-1-sulfonic acid,
3-hydroxy-heptadecane-1-sulfonic acid,
4-hydroxy-heptadecane-1-sulfonic acid,
5-hydroxy-heptadecane-1-sulfonic acid,
4-hydroxy-nonadecane-1-sulfonic acid,
5-hydroxy-nonadecane-1-sulfonic acid,
3-hydroxy-eicosane-1-sulfonic acid,
4-hydroxy-eicosane-1-sulfonic acid,
5-hydroxy-eicosane-1-sulfonic acid,
3-hydroxy-heneicosane-1-sulfonic acid,
4-hydroxy-heneicosane-1-sulfonic acid,
5-hydroxy-heneicosane-1-sulfonic acid,
3-hydroxy-docosane-1-sulfonic acid,
4-hydroxy-docosane-1-sulfonic acid,
5-hydroxy-docosane-1-sulfonic acid,
3-hydroxy-tricosane-1-sulfonic acid,
4-hydroxy-tricosane-1-sulfonic acid,
5-hydroxy-tricosane-1-sulfonic acid,
3-hydroxy-tetracosane-1-sulfonic acid,
4-hydroxy-tetracosane-1-sulfonic acid, and
5-hydroxy-tetracosane-1-sulfonic acid.

Typical disulfonic acids and other sulfonic acids convertible to salts in accordance with the teachings of the present invention include:

1-decene-1,2-disulfonic acid,
2-dodecene-1,2-disulfonic acid,
2-tetradecene-1,3-disulfonic acid,
5-pentadecene-1,3-disulfonic acid,
3-hydroxy-3-decene-1,2-disulfonic acid,
3-hydroxy-decane-1,5-disulfonic acid,
decane-1-sulfonic acid,
undecane-1-sulfonic acid,
dodecane-1-sulfonic acid,
tridecane-1-sulfonic acid,
tetradecane-1-sulfonic acid,
pentadecane-1-sulfonic acid,
hexadecane-1-sulfonic acid,
heptadecane-1-sulfonic acid,
octadecane-1-sulfonic acid,
nonadecane-1-sulfonic acid,
eicosane-1-sulfonic acid,
tetradecane-2-sulfonic acid,
hexadecane-3-sulfonic acid,
2-ethyl-hexadecane-1-sulfonic acid,
2-methyldodecane-1-sulfonic acid.

Other sulfonic acids useful are alkyl benzene sulfonic acids having an alkyl chain containing 10 to 18 carbon atoms.

Some of the foregoing and additional sultones and sulfonic acids and other materials useful in accordance with the teachings of the present invention are described in terms of a starting material produced by sulfonation of various individual olefins or olefin mixtures exemplified by the following: decene-1, undecene-1, dodecene-1, tridecene-1, tetradecene-1, pentadecene-1, hexadecene-1, heptadecene-1, octadecene-1, nonadecene-1, eicosene-1, triacontene-1, 2-ethyl-hexene-1, 2-methyl undecene-1, 2-ethyl decene-1, 2-propyl undecene-1, 2-butyl decene-1, 2-pentyl decene-1, 2-hexyl octene-1, decene-2, undecene-3, dodecene-4, tridecene-2, tetradecene-5, pentadecene-7, hexadecene-6, heptadecene-8, octadecene-2, nonadecene-2, eicosene-2, tricosene-2, 3-ethyl-dodecene-2. Sultone derivatives of the foregoing olefins are generally of the form 1,2-; 1,3-; 1,4-; 1,5-; 2,3-; 2,4-; 2,5-; 2,6- or the like depending upon the procedures used in sulfonation and on the starting olefin. Alkene sulfonic acids, hydroxy alkyl sulfonic acids and disulfonic acids are isomeric in nature depending to some extent upon the predominant form of the co-present or precursor sultones.

The temperature of the present reaction, although important, is not particularly critical and can be influenced to a degree by pressure. The continuous volatilization removal of the by-product acid, such as HX, is desired as well as the avoidance of vaporizing loss of the other reactants or product. In some instances, operation at reflux of water or the use of stripping agents is preferred to facilitate the expulsion of liberated acid. As far as the fundamental conversion reaction is concerned, temperatures of from about 50 to about 250° C. are useful with temperatures of from about 120 to about 200° C. being preferred because of equipment cost and other considerations. Similarly, pressure is not critical with various pressures of from about 0.1 to about 100 atmospheres being suitable. In general, it is preferred to operate at atmospheric pressure or at from about ½ to about 10 atmospheres pressure to avoid costly pressure or vacuum equipment.

Where a subsequent exchange reaction with a base is used to produce sulfonic acid salts having a different cation from that provided for the conversion reaction, similar temperature and pressure considerations apply, permissible temperatures extending downward to about 0° C. with temperatures of from about 20 to about 80° C. being preferred.

As a general proposition, sulfonic acid salts produced by the present process have valuable surface active properties and are useful with other materials in built and un-built formulations known to those skilled in the art. For example, U.S. Pats. 3,332,874–3,332,880 describe combinations of sulfonic acids salts with alkyl glyceryl ether sulfonates, with alkyl aryl sulfonates and alkyl ether sulfates, with esters of condensates of coconut fatty alcohols and 3(N,N-dimethyl-N-alkylammonio)-2-hydroxypropane-1-sulfonate, with amides, and with amides and alkyl glyceryl ether sulfonates. The present products are useful in such ways in various forms, such as liquid, flake, granule, tablet and bar form. When used with builders and other adjuvants, conventional materials and proportions may be used as set forth for example in U.S. Pat. 3,332,880, columns 10 and 11, herein incorporated by reference.

The following examples set forth the best mode contemplated by the inventor of carrying out the invention.

EXAMPLE I $C_{16}$ sultone was obtained by sulfonating hexadecene-1 with gaseous uncomplexed $SO_3$ diluted with nitrogen. The $SO_3$/olefin ratio was about 1.1. Temperature was about 40° C. The crude sulfonation effluent was extracted with pentane and the pentane extract evaporated to dryness to produce the sultone.

To a 10 cc. flask was added 1.3 grams of sultone, 5 cc. of $H_2O$ and 0.3 grams of NaCl.

The mixture was heated slowly driving off first some water and then a mixture of HCl-water. The system was evaporated to dryness and allowed to cool.

A portion of 5 cc. of water was then added to the system and the pH measured. The pH was about 4. Again the system was evaporated to dryness. The residue thus obtained was titrated with NaOH and found to contain approximately 3 percent free acid (calculated as sulfonic acid) corresponding to a 97 percent conversion of the sultone to the sodium sulfonate salt.

EXAMPLE II

Example I was repeated using a stoichiometric amount of sodium sulfide. Hydrogen sulfide was evolved rapidly leaving a solution, indicating conversion of the poorly soluble sultone to a soluble species.

We claim:
1. A process for producing sulfonic acid salt which comprises reacting an alkyl sultone having from about 6 to about 36 carbon atoms per molecule in an aqueous system with an ammonium, alkali metal or alkaline earth metal halide salt reactant having a halogen anion which forms a volatile compound when combined with hydrogen and a cation which corresponds to the cation of the sulfonic acid salt being formed at temperatures from about 50° to about 250° C., while removing said volatile hydrogen halide compound to enhance conversion of the sultone to sulfonic acid salt.
2. The process of claim 1 wherein the sultone has from about 10 to about 20 carbon atoms per molecule.
3. The process of Claim 1 wherein said salt reactant is a chloride, bromide or fluoride.
4. The process of Claim 1 wherein the temperature is from about 120 to about 200° C.
5. The process of Claim 1 wherein said salt reactant is ammonium chloride, ammonium bromide, ammonium fluoride, ammonium bifluoride, an alkali metal chloride, an alkali metal bromide, an alkali metal fluoride, an alkali metal bifluoride, an alkaline earth metal chloride, an alkaline earth metal bromide, or an alkaline earth metal fluoride.
6. The process of Claim 1 wherein said salt reactant is ammonium chloride.
7. The process of Claim 1 wherein said salt reactant is sodium chloride.
8. The process of Claim 1 wherein the salt reactant is sodium chloride, potassium chloride, magnesium chloride, or calcium chloride, employed in an approximately stoichiometric amount required to react with the sultone.
9. The process of Claim 1 wherein the sultone is fed in a mixture with sulfonic acid.
10. The process of Claim 1 wherein the sultones are supplied in an acid-mix obtained from sulfonating an olefin or an olefin mixture.

References Cited

UNITED STATES PATENTS

| | | | |
|---|---|---|---|
| 2,552,421 | 5/1951 | Gilbert et al. | 260—513 R |
| 2,974,152 | 5/1961 | Schulee et al. | 260—513 R |
| 1,396,320 | 11/1921 | Cole | 260—505 |
| 2,766,276 | 10/1956 | Kolling | 260—513 |
| 2,594,875 | 4/1952 | Condit | 260—505 |
| 2,682,509 | 6/1954 | Ross | 260—505 |

FOREIGN PATENTS

| | | | |
|---|---|---|---|
| 3,342 | 7/1882 | Great Britain | 260—505 |

LEON ZITVER, Primary Examiner

N. CHAN, Assistant Examiner